3,284,458
1-NITROSOPIPERIDINES
Bill Elpern, Lafayette Hill, Pa., assignor to Sterling Drug Inc., New York, N.Y., a corporation of Delaware
No Drawing. Filed Aug. 19, 1963, Ser. No. 303,179
12 Claims. (Cl. 260—294.3)

This invention relates to organic chemical compounds and their preparation. More particularly, the invention is concerned with novel compounds of the class of substituted piperidines.

One aspect of my invention resides in the concept of a composition having a molecular structure in which a nitroso group is attached to the ring-nitrogen atom of a piperidine ring system which is substituted in the 4-position by a carboxylic acyl group.

The physical embodiments of my invention are useful as intermediates for preparing compounds having analgesic and antitussive activities.

The compounds of my invention are represented by the general structural Formula I

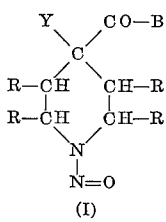

(I)

wherein B is a member of the group consisting of lower-alkoxy, lower-alkyl, phenyl-lower-alkyl, and di-(lower-alkyl)amino-lower-alkyl; R is a member of the group consisting of H and lower-alkyl; and Y is a member of the group consisting of H, phenyl-lower-alkyl and $\phi$, where $\phi$ is phenyl or equivalent aromatic radical such as $\alpha$- or $\beta$-naphthyl or $\alpha$- or $\beta$-thienyl.

In the above Formula I, the lower alkyl is a straight- or branched-chain saturated aliphatic radical of from one to seven carbon atoms. Examples of lower-alkyl radicals represented by R and B include methyl, ethyl, propyl, isopropyl, n-butyl, isobutyl, tert.-butyl, n-amyl, n-hexyl, n-heptyl and the like.

In the above Formula I, phenyl-lower-alkyl is a lower-alkyl radical bearing a phenyl substituent, or equivalent, the nucleus of which can be substituted with from one to three substituents of low molecular weight. Examples of suitable low-molecular weight substituents on the nucleus are lower-alkyl, lower-alkoxy, lower-alkylmercapto, lower-alkanesulfonyl, halo, di-(lower-alkyl)amino, lower - alkanoylamino, trifluoromethyl, and hydroxy. Where there is more than one substituent, said substituents can be the same or different and they can be in any of the position combinations relative to each other.

In the above Formula I, when Y represents $\phi$, it is phenyl or an aromatic radical equivalent to phenyl; that is $\alpha$- or $\beta$-naphthyl or $\alpha$- or $\beta$-thienyl. The $\phi$ radical can be substituted with low-molecular weight substituents, as described above, which can be the same or different and can be located in any of the available positions of the nucleus.

Another aspect of my invention resides in the processes for preparing compounds of Formula I. The compounds of Formula I can be prepared from the corresponding 1-unsubstituted piperidines by the reaction of the latter with one molar equivalent of a nitrosating agent. The preferred nitrosating agent in nitrous acid, and the preferred temperature range for this nitrosating reaction is 0–90° C. The nitrous acid is conveniently prepared in situ from a metal nitrite, for example sodium nitrite, and a mineral or other strong acid, for example hydrochloric acid. Although the above constitutes the preferred process for preparing the compounds of my invention, other known methods for nitrosating secondary amines can be used for the purposes of this invention. For example, the secondary amines form N-nitroso derivatives by reaction wit halkyl nitrites or nitrogen trioxide.

The 1-unsubstituted piperidines employed as starting materials for the preparation of the compounds of my invention are generally known or are readily prepared by procedures well known to those skilled in the art. I prefer to prepare them by hydrogenolysis of the corresponding N-benzyl compounds in the presence of a palladium-charcoal catalyst. The requisite N-benzyl piperidines can be prepared, for example, by methods discussed by Suter, Medicinal Chemistry, vol. II, John Wiley & Sons, New York, 1956, pp. 219–225.

The compounds of my invention are useful as intermediates for preparing analgesic and antitussive agents. For example the nitroso group attached to the ring nitrogen atom can be reduced with active-metal/acid combinations such as zinc and acetic acid or amalgamated aluminum and water (moist ether) to give N-aminopiperidines which have analgesic and antitussive properties. The latter compounds can be cyclized according to the procedures disclosed in the copending application, S.N. 236,705, now Patent No. 3,198,801, of Philip M. Carabateas to produce 1,2-diazabicyclo[2.2.2]octanes which are useful as antitussive agents.

The compound illustrated in Example 1 below, ethyl 1-nitroso-4-phenylisonipecotate, is useful for the preparation of ethyl 1-amino-4-phenylisonipecotate, a known compound which has been reported to have analgesic properties [Arch. exptl. Path. Pharmakol., 196, 109 (1940)].

The molecular structures of the compounds of my invention are established by their mode of synthesis and corroborated by the correspondence of calculated and found values for the elemental analyses for representative samples.

The following examples will further illustrate my invention without limiting the latter thereto.

EXAMPLE 1

*Ethyle 1-nitroso-4-phenylisonipecotate*

A solution containing 81.2 g. (0.30 mole) of ethyl 4-phenylisonipecotate hydrochloride in 600 ml. of water was made acidic to litmus with 10 ml. of concentrated hydrochloric acid. A solution of 22.5 g. (0.325 mole) of sodium nitrite in 30 ml. of water was added dropwise during 0.25 hour. The mixture was stirred at room temperature for 2 hours, heated to 60° C. for 0.25 hours, cooled and allowed to stand overnight. The mixture was then extracted with benzene. Removal of the solvent from the benzene layer under reduced pressure yielded a yellow oil, consisting of crude ethyl 1-nitroso-4-phenylisonipecotate, which crystallized when chilled in solid carbon dioxide. Recrystallization of this product from aqueous ethanol gave pure ethyl 1-nitroso-4-phenylisonipecotate, which melted at 44.4–47.6° C. This compound, which can also be named 4-ethoxycarbonyl-1-nitroso-4-phenylpiperidine, has the structural formula

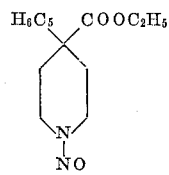

Ethyl 1-nitroso-4-phenylisonipecotate was reduced with an excess of zinc dust and dilute acetic acid to give ethyl 1-amino-4-phenylisonipecotate which, in the form of its hydrochloride salt, melted at 177.4–179.6° C.

The following N-nitrosopiperidines were prepared according to the procedure given in Example 1, using the indicated substituted piperidine compound in place of ethyl 4-phenylisonipecotate:

| Compound | Starting Material | M.P., ° C. |
|---|---|---|
| 1-nitroso-4-acetyl-4-phenylpiperidine. | 4-acetyl-4-phenyl-piperidine. | 58–60. |
| 1-nitroso-4-propionyl-4-phenylpiperidine. | 4-propionyl-4-phenyl-piperidine. | 83–84. |
| 1-nitroso-4-butyryl-4-phenylpiperidine. | 4-butyryl-4-phenyl-piperidine. | 95–96.5. |
| 1-nitroso-4-valeryl-4-phenylpiperidine. | 4-valeryl-4-phenyl-piperidine. | Oil.[1] |
| 1-nitroso-4-octanoyl-4-phenylpiperidine. | 4-octanoyl-4-phenyl-piperidine. | Oil.[1] |
| 1-nitroso-4-butyryl-piperidine. | 4-butyrylpiperidine. | Oil.[1] |
| Methyl-1-nitrosoisonipecotate. | Methyl isonipecotate. | Oil,[1] $N_D^{27}$ 1.4920. |

[1] Some of the N-nitrosopiperidines are unstable to heat; since they were obtained quite pure from their reaction mixtures, the oils were not distilled.

Following the procedure given in Example 1, the following compounds can also be prepared by employing the indicated substituted piperidine compound in place of ethyl 4-phenylisonipecotate:

| Compound | Starting Material |
|---|---|
| 1-nitroso-4-(3-butenoyl)-4-phenylpiperidine. | 4-(3-butenoyl)-4-phenylpiperidine. |
| 1-nitroso-4-(β-dimethylaminopropionyl)-4-phenylpiperidine. | 4-(β-dimethylaminopropionyl)-4-phenylpiperidine. |
| Ethyl 1-nitroso-2,3,5,6-tetramethyl-4-phenylisonipecotate. | Ethyl 2,3,5,6-tetramethyl-4-phenylisonipecotate. |
| Ethyl 1-nitroso-4-benzylisonipecotate. | Ethyl 4-benzylisonipecotate. |
| Ethyl 1-nitroso-4-(2-thienyl)-isonipecotate. | Ethyl 4-(2-thienyl)isonipecotate. |
| Ethyl 1-nitroso-4-(1-naphthyl)-isonipecotate. | Ethyl 4-(1-naphthyl)isonipecotate. |
| Ethyl 1-nitroso-4-(3-methoxyphenyl)isonipecotate. | Ethyl 4-(3-methoxyphenyl)-isonipecotate. |
| 1-nitroso-4-phenylacetyl-4-phenylpiperidine. | 4-phenylacetyl-4-phenyl-piperidine. |
| 1-nitroso-4-(3-phenylpropionyl)-4-phenylpiperidine. | 4-(3-phenylpropionyl)-4-phenyl-piperidine. |
| 1-nitroso-4-(6-hydroxy-3-methylphenyl)isonipecotic acid lactone. | 4-(6-hydroxy-3-methylphenyl)-isonipecotic acid lactone. |
| 1-nitroso-4-phenylacetylpiperidine. | 4-phenylacetylpiperidine. |
| Ethyl 1-nitroso-4-(4-trifluoromethylphenyl)-isonipecotate. | Ethyl 4-(4-trifluoromethylphenyl)-isonipecotate. |
| Ethyl 1-nitroso-4-(4-chlorophenyl)-isonipecotate. | Ethyl 4-(4-chlorophenyl)isonipecotate. |
| 1-nitroso-4-(4-acetamidophenyl)-4-butyrylpiperidine. | 4-(4-acetamidophenyl)-4-butyryl-piperidine. |
| 1-nitroso-4-(4-methylmercaptophenyl)-4-isobutyrylpiperidine. | 4-(4-methylmercaptophenyl)-4-isobutyrylpiperidine. |
| 1-nitroso-4-(4-methanesulfonyl)-4-diethylaminoacetylpiperidine. | 4-(4-methanesulfonyl)-4-diethylaminoacetylpiperidine. |
| Ethyl 1-nitroso-4-(2-naphthyl)-isonipecotate. | Ethyl 4-(2-naphthyl)-isonipecotate. |
| 1-nitroso-4-(3-thienyl)-4-acetylpiperidine. | 1-nitroso-4-(3-thienyl)-4-acetyl-piperidine. |
| 1-nitroso-4-(3-dimethylaminophenyl)-4-(4-methoxyphenylacetyl)-piperidine. | 4-(3-dimethylaminophenyl)-4-(4-methoxyphenylacetyl)-piperidine. |

I claim:
1. A compound of the formula

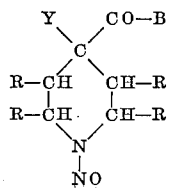

wherein B is a member of the group consisting of lower-alkoxy, lower-alkyl, phenyl-lower-alkyl and di-(lower-alkyl)amino-lower-alkyl, R is a member of the group consisting of H and lower-alkyl, and Y is a member of the group consisting of H, phenyl-lower-alkyl, phenyl, naphthyl, thienyl and phenyl substituted with a member of the class consisting of lower-alkyl, lower-alkoxy, lower-alkylmercapto, lower-alkanesulfonyl, halo, di-(lower-alkyl)amino, lower-alkanoylamino, trifluoromethyl and hydroxy.

2. A compound of the formula

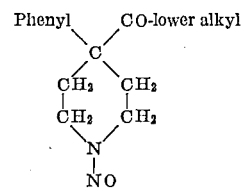

3. A compound of the formula

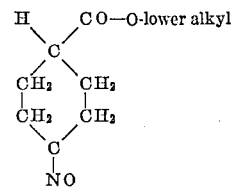

4. A compound of the formula

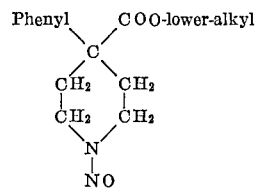

5. 4-ethoxycarbonyl-1-nitroso-4-phenylpiperidine.
6. Methyl 1-nitrosoisonipecotate.
7. 1-nitroso-4-(n-butyrl)-4-phenylpiperidine.
8. 1-nitroso-4-(n-butyryl)piperidine.
9. 1-nitroso-4-acetyl-4-phenylpiperidine.
10. 1-nitroso-4-propionyl-4-phenylpiperidine.
11. 1-nitroso-4-(n-octanoyl)-4-phenylpiperidine.
12. 1-nitroso-4-(n-valeryl)-4-phenylpiperidine.

References Cited by the Examiner

Conant et al.: "The Chemistry of Organic Compounds," fourth edition, page 178, Macmillan (1952).

ALEX MAZEL, *Primary Examiner.*

HENRY R. JILES, *Examiner.*

JOSE TOVAR, *Assistant Examiner.*

UNITED STATES PATENT OFFICE
CERTIFICATE OF CORRECTION

Patent No. 3,284,458                                November 8, 1966

Bill Elpern

It is hereby certified that error appears in the above numbered patent requiring correction and that the said Letters Patent should read as corrected below.

Column 2, line 6, for "wit halkyl" read -- with alkyl --; line 44, for "Ethyle" read -- Ethyl --; lines 63 to 69, for that portion of the formula reading $$H_6C_5 \quad\quad\quad \text{read} \quad\quad\quad C_6H_5$$

column 4, lines 25 to 34, for that portion of the formula reading $$\begin{array}{c} C \\ | \\ NO \end{array} \quad\quad \text{read} \quad\quad \begin{array}{c} N \\ | \\ NO \end{array}$$

same column 4, line 51, for "butyrl" read -- butyryl --.

Signed and sealed this 12th day of September 1967.

(SEAL)
Attest:

ERNEST W. SWIDER
Attesting Officer

EDWARD J. BRENNER
                                   Commissioner of Patents